United States Patent
Tan et al.

(10) Patent No.: US 8,755,810 B2
(45) Date of Patent: Jun. 17, 2014

(54) METHOD AND DEVICE FOR RANK ADAPTATION

(75) Inventors: Yuanchun Tan, Shenzhen (CN); Focai Peng, Shenzhen (CN); Liping Liu, Shenzhen (CN); Xianxi Li, Shenzhen (CN); Juanjuan Liu, Shenzhen (CN); Liang Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/258,557

(22) PCT Filed: Mar. 5, 2010

(86) PCT No.: PCT/CN2010/070888
§ 371 (c)(1),
(2), (4) Date: Feb. 9, 2012

(87) PCT Pub. No.: WO2011/020317
PCT Pub. Date: Feb. 24, 2011

(65) Prior Publication Data
US 2012/0196612 A1      Aug. 2, 2012

(30) Foreign Application Priority Data
Aug. 19, 2009   (CN) .......................... 2009 1 0168088

(51) Int. Cl.
  H04W 72/06   (2009.01)
(52) U.S. Cl.
  USPC ...................................... 455/452.1; 375/224
(58) Field of Classification Search
  USPC ......... 455/452.1, 507; 375/224, 260; 370/329
  See application file for complete search history.

(56) References Cited

U.S. PATENT DOCUMENTS

| | | | |
|---|---|---|---|
| 2009/0086648 A1* | 4/2009 | Xu et al. | 370/252 |
| 2010/0046445 A1* | 2/2010 | Sawahashi et al. | 370/329 |
| 2011/0194596 A1* | 8/2011 | Svedman et al. | 375/224 |
| 2011/0237267 A1* | 9/2011 | Chen et al. | 455/450 |
| 2012/0188881 A1* | 7/2012 | Ma et al. | 370/252 |

FOREIGN PATENT DOCUMENTS

| | | |
|---|---|---|
| CN | 101174924 A | 5/2008 |
| CN | 101505205 A | 8/2009 |
| JP | 2009-111781 A | 5/2009 |
| WO | WO 2009/057559 A1 | 5/2009 |
| WO | WO 2009/074880 A2 | 6/2009 |
| WO | WO 2009/091307 A1 | 7/2009 |
| WO | WO 2009/099151 A1 | 8/2009 |

OTHER PUBLICATIONS

English-language abstract of PCT Patent Application Publication No. WO 2009/057559 A1, May 7, 2009.

(Continued)

*Primary Examiner* — Myron K Wyche
(74) *Attorney, Agent, or Firm* — DASCENZO Intellectual Property Law, P.C.

(57) ABSTRACT

The present invention discloses a method and apparatus for rank self-adaptation. The method comprises: a base station receiving ranks reported by a user equipment via a rank receiving window, determining a rank at the current moment based on a distribution state of each rank in the rank receiving window at the current moment, and determining the number of independent channels used for sending downstream data to the user equipment based on the rank at the current moment. The present invention can reasonably forecast change of ranks of MIMO channels so as to better use MIMO channel resources to perform data transmission and improve the throughput rate of the MIMO channels.

18 Claims, 1 Drawing Sheet

(56) References Cited

OTHER PUBLICATIONS

English-language abstract of Japan Patent No. JP 2009-111781A, European Patent Office, May 21, 2009.
English-language abstract of PCT Patent Application Publication No. WO 2009/099151 A1, Aug. 13, 2009.
R1-080382, "On the Need of Rank Adaptation for High Mobility UE," Nortel, 3GPP TSG-RAN WG1#51bis, Sevilla, Spain, Jan. 14-18, 2008, pp. 1-6.
R1-080383, "System Level Simulation of Adaptive MIMO for High Speed UE," Nortel, 3GPP TSG-RAN WG1#51bis, Sevilla, Spain, Jan. 14-18, 2008, pp. 1-6.

* cited by examiner

METHOD AND DEVICE FOR RANK ADAPTATION

TECHNICAL FIELD

The present invention relates to the communication field, and more particularly, to a method and apparatus for rank self-adaptation.

BACKGROUND OF THE RELATED ART

The multi-input multi-output (MIMO for short) technique is a wireless transmission technique using multiple ($N_T$) transmitting antennas and multiple ($N_R$) receiving antennas. It can effectively improve the capacity and the link transmission performance of a wireless network. MIMO channels (represented by a matrix $H_{N_T, N_R}$) formed by $N_T$ transmitting antennas and $N_R$ receiving antennas can be divided into $N_S$ independent channels, and the value range of $N_S$ is [1, $N_{maxS}$], where $N_{maxS}$=min{$N_T$, $N_R$}. The value of $N_S$ is determined by the relativity of the MIMO channels. The greater the relativity of the MIMO channels is, the smaller the value of $N_S$ is; the smaller the relativity of the MIMO channels is, the greater the value of $N_S$ is. In a Long Term Evolution (LTE for short) system, $N_S$ at a User Equipment (UE for short) side is referred to as a rank, $N_S$ at a network side is referred to as a layer.

There are mainly two approaches for implementing the MIMO technique: spatial diversity and spatial multiplexing. In the LTE system, for the spatial multiplexing mode, the UE needs to feed back ranks of the MIMO channels to the network side, which performs rank self-adaptation processing based on the ranks fed back by the UE. A simple rank self-adaptation processing method is that the network side controls the number of the independent channels sending downstream data based on the newly reported rank ($N_S$) at the UE side. As the ranks of the MIMO channels change slowly, this method enables the network side to effectively self-adapt the rank change of the MIMO channels. However, when the ranks of the MIMO channels change quickly (e.g., when the UE is in a high-speed moving state), the difference between the newly reported rank at the UE side used by the network side and the rank of the current actual MIMO channel may be greater such that spatial advantages of the MIMO will be given a great discount.

SUMMARY OF THE INVENTION

A technical problem to be solved by the present invention is to provide a method and apparatus for rank self-adaptation so as to update values of ranks self-adaptively and improve the throughput rate of MIMO channels.

In order to solve the above technical problem, the present invention provides a method for rank self-adaptation comprising:

a base station receiving ranks reported by a user equipment via a rank receiving window, determining a rank at the current moment based on a distribution state of each rank in the rank receiving window at the current moment, and determining the number of independent channels used for sending downstream data to the user equipment based on the rank at the current moment.

Further, in the method, in the step of determining the rank at the current moment:

when the number of ranks in the rank receiving window is greater than a threshold A and the distribution state of each rank in the rank receiving window at the current moment is state 2, the base station takes a rank newly reported by the user equipment in the rank receiving window as the rank at the current moment;

wherein state 2 means that:

when the smallest value $N_{maxS}$ among the number of receiving antennas and the number of transmitting antennas is greater than or equal to 2 and is less than or equal to 7, distribution of each rank in the rank receiving window meets the following conditions: the ranks in the rank receiving window in turn are continuous x and continuous y, where values of x and y differ by 1, and the number of y is greater than or equal to the number of x; or when $N_{maxS}$ is equal to 8, distribution of each rank in the rank receiving window meets the following conditions: the ranks in the rank receiving window in turn are continuous x, continuous y and continuous z, where difference values of x, y, z in turn are 1, values of x, y, z in turn increase or decrease, and the total number of y and z is greater than or equal to the number of x, and the number of z is greater than or equal to the number of y.

Further, in the method, in the step of determining the rank at the current moment:

when the number of the ranks in the rank receiving window is greater than the threshold A and the distribution state of each rank in the rank receiving window at the current moment is state 3, state 3 means that the ranks in the rank receiving window in turn are continuous x and one y, the absolute difference value between y and x is m, m is greater than or equal to 1 and is less than or equal to $N_{maxS}-1$, $N_{maxS}$ is the smallest value among the number of the receiving antennas and the number of the transmitting antennas; and the base station is further configured to:

when the difference value between y and x is less than 0, take the newly reported rank in the rank receiving window as the rank at the current moment;

when the difference value between y and x is greater than 0 and the user equipment is located at the edge of a cell to which the user equipment belongs, take 1 as the rank at the current moment;

when the difference value between y and x is greater than 0 and the user equipment is not located at the edge of the cell to which the user equipment belongs, take x+1 as the rank at the current moment.

Further, in the method, in the step of determining the rank at the current moment:

when the number of the ranks in the rank receiving window is greater than the threshold A and the distribution state of each rank in the rank receiving window at the current moment is state 4, state 4 means that the ranks in the rank receiving window in turn are continuous x and y, x is not equal to y, the number of y is less than the number of x, and the number of y is greater than or equal to n, and n is greater than or equal to 2; and the base station is further configured to:

when the value of y is less than x, take the newly reported rank in the rank receiving window as the rank at the current moment;

when the value of y is greater than or equal to x and the user equipment is located at the edge of the cell to which the user equipment belongs, take 1 as the rank at the current moment;

when the value of y is greater than or equal to x and the user equipment is not located at the edge of the cell to which the user equipment belongs, take the newly reported rank in the rank receiving window as the rank at the current moment.

Further, in the method, the user equipment being located at the edge of the cell to which the user equipment belongs means that reference signal received power of the cell reported by the user equipment is less than or equal to a reference signal received power threshold of the cell configured by a system; and the user equipment being not located at the edge of the cell to which the user equipment belongs means that the reference signal received power of the cell reported by the user equipment is greater than the reference signal received power threshold of the cell configured by the system.

Further, in the method, in the step of determining the rank at the current moment:

when the number of the ranks in the rank receiving window is greater than the threshold A and the distribution state of each rank in the rank receiving window at the current moment is state 5, the base station takes the smallest rank in the rank receiving window as the rank at the current moment;

state 5 means that when the smallest value $N_{maxS}$ among the number of the receiving antennas and the number of the transmitting antennas is greater than or equal to 2 and is less than or equal to 7, distribution of each rank in the rank receiving window meets the following conditions: the ranks in the rank receiving window in turn are an alternate sequence of x and y, the value of y and the value of x differ by 1; or when $N_{maxS}$ is equal to 8, distribution of each rank in the rank receiving window meets the following conditions: the ranks in the rank receiving window comprise x and y and there are no continuous x and y, the value of y and the value of x differ by 1 or 2, or the ranks in the rank receiving window comprise x, y and z, and one of x, y and z is adjacent to the other two.

Further, in the method, in the step of determining the rank at the current moment:

when the number of the ranks in the rank receiving window is greater than the threshold A, and the smallest value $N_{maxS}$ among the number of the receiving antennas and the number of the transmitting antennas is greater than or equal to 2 and is less than or equal to 3, and when the distribution state of each rank in the rank receiving window at the current moment does not meet state 1, state 2, state 3 and state 4, takes 1 as the rank at the current moment;

state 1 means that the value of each rank in the rank receiving window is the same;

state 2 means that distribution of each rank in the rank receiving window meets the following conditions: the ranks in the rank receiving window in turn are continuous x and continuous y, where the value of x and the value of y differ by 1, the number of y is greater than or equal to the number of x;

state 3 means that the ranks in the rank receiving window in turn are continuous x and one y, the absolute difference value between y and x is m, m is greater than or equal to 1 and is less than or equal to $N_{maxS}-1$; and state 4 means that the ranks in the rank receiving window in turn are continuous x and y, x is not equal to y, the number y is less than the number of x, and the number of y is greater than or equal to n, and n is greater than or equal to 2.

Further, in the method, in the step of determining the rank at the current moment:

when the number of the ranks in the rank receiving window is greater than the threshold A, and the smallest value $N_{maxS}$ among the number of the receiving antennas and the number of the transmitting antennas is greater than or equal to 4, and when the distribution state of each rank in the rank receiving window at the current moment does not meet state 1, state 2, state 3, state 4 and state 5, the base station takes the smallest rank in the rank receiving window as the rank at the current moment;

state 1 means that the value of each rank in the rank receiving window is the same;

state 2 means that when $N_{maxS}$ is greater than or equal to 4 and is less than or equal to 7, distribution of each rank in the rank receiving window meets the following conditions: the ranks in the rank receiving window in turn are continuous x and continuous y, the value of x and the value of y differ by 1, and the number of y is greater than or equal to the number of x; or when $N_{maxS}$ is equal to 8, distribution of each rank in the rank receiving window meets the following conditions: the ranks in the rank receiving window in turn are continuous x, continuous y and continuous z, where difference values between x, y, z in turn are 1, values of x, y, z in turn increase or decrease, and the total number of y and z is greater than or equal to the number of x, the number of z is greater than or equal to the number of y;

state 3 means that the ranks in the rank receiving window in turn are continuous x and one y, the absolute difference value between y and x is m, m is greater than or equal to 1 and is less than or equal to $N_{maxS}-1$;

state 4 means that the ranks in the rank receiving window in turn are continuous x and y, x is not equal to y, the number of y is less than the number of x, and the number of y is greater than or equal to n, and n is greater than or equal to 2;

state 5 means that when $N_{maxS}$ is greater than or equal to 4 and is less than or equal to 7, distribution of each rank in the rank receiving window meets the following conditions: the ranks in the rank receiving window in turn are an alternate sequence of x and y, the value of y and the value of x differ by 1; or when $N_{maxS}$ is equal to 8, distribution of each rank in the rank receiving window meets the following conditions: the ranks in the rank receiving window comprise x and y and there is no continuous x and y, the value of y and the value of x differ by 1 or 2, or the ranks in the rank receiving window comprise x, y and z and one of the x, y and z is adjacent to the other two.

Further, in the method, in the step of determining the rank at the current moment:

when the number of the ranks in the rank receiving window is less than the threshold A, the base station takes the smallest rank in the rank receiving window as the rank at the current moment.

Further, in the method:
the threshold A is an integer greater than or equal to 3.

In order to solve the above technical problem, the present invention provides an apparatus for rank self-adaptation comprising a connected rank receiving unit and a rank determining unit;

the rank receiving unit is configured to receive ranks reported by a user equipment via a rank receiving window to send to the rank determining unit;

the rank determining unit is configured to determine a rank at the current moment based on a distribution state of each rank in the rank receiving window at the current moment, and determine the number of independent channels used for sending downstream data to the user equipment based on the rank at the current moment.

Further, the apparatus may further have the following features:

the rank determining unit is further configured to, when determining that the number of ranks in the rank receiving window is greater than a threshold A and the distribution state of each rank in the rank receiving window at the current moment is state 2, take a rank newly reported by the user equipment in the rank receiving window as the rank at the current moment;

wherein state 2 means that:
when the smallest value $N_{maxS}$ among the number of receiving antennas and the number of transmitting antennas is greater than or equal to 2 and is less than or equal to 7, distribution of each rank in the rank receiving window meets the following conditions: the ranks in the rank receiving window in turn are continuous x and continuous y, where values of x and y differ by 1, and the number of y is greater than or equal to the number of x; or when $N_{maxS}$ is equal to 8, distribution of each rank in the rank receiving window meets the following conditions: the ranks in the rank receiving window in turn are continuous x, continuous y and continuous z, where difference values of x, y, z in turn are 1, values of x, y, z in turn increase or decrease, and the total number of y and z is greater than or equal to the number of x, and the number of z is greater than or equal to the number of y.

Further, the apparatus further comprises a user equipment position measurement unit connected to the rank determining unit, wherein the user equipment position measurement unit is configured to measure whether a user equipment is located at the edge of a cell to which the user equipment belongs;

the rank determining unit is further configured to: when determining that the number of the ranks in the rank receiving window is greater than the threshold A and the distribution state of each rank in the rank receiving window at the current moment is state 3, state 3 meaning that the ranks in the rank receiving window in turn are continuous x and one y, the absolute difference value between y and x is m, m is greater than or equal to 1 and is less than or equal to $N_{maxS}-1$, and $N_{maxS}$ is the smallest value among the number of the receiving antennas and the number of the transmitting antennas, when determining that the difference value between y and x is less than 0, take the newly reported rank in the rank receiving window as the rank at the current moment;

when determining that the difference value between y and x is greater than 0, obtain information whether the user equipment is located at the edge of a cell to which the user equipment belongs from the user equipment position measurement unit, and determine the rank at the current moment based on the position of the user equipment: when the user equipment is located at the edge of the cell to which the user equipment belongs, take 1 as the rank at the current moment; and when the user equipment is not located at the edge of the cell to which the user equipment belongs, take x+1 as the rank at the current moment.

Further, the apparatus also comprises a user equipment position measurement unit connected to the rank determining unit, wherein the user equipment position measurement unit is configured to measure whether the user equipment is located at the edge of the cell to which the user equipment belongs;

the rank determining unit is further configured to: when determining that the number of the ranks in the rank receiving window is greater than the threshold A and the distribution state of each rank in the rank receiving window at the current moment is state 4, state 4 meaning that the ranks in the rank receiving window in turn are continuous x and y, x is not equal to y, the number of y is less than the number of x, and the number of y is greater than or equal to n, and n is greater than or equal to 2, when determining that the value of y is less than x, take the newly reported rank in the rank receiving window as the rank at the current moment;

when determining that the value of y is greater than or equal to x, obtain information whether the user equipment is located at the edge of a cell to which the user equipment belongs from the user equipment position measurement unit, and determine the rank at the current moment based on the position of the user equipment: when the user equipment is located at the edge of the cell to which the user equipment belongs, take 1 as the rank at the current moment; and when the user equipment is not located at the edge of the cell to which the user equipment belongs, take the newly reported rank in the rank receiving window as the rank at the current moment.

Further, the apparatus may further have the following features:

the rank determining unit is further configured to, when determining that the number of the ranks in the rank receiving window is greater than the threshold A and the distribution state of each rank in the rank receiving window at the current moment is state 5, take the smallest rank in the rank receiving window as the rank at the current moment;

state 5 meaning that when the smallest value $N_{maxS}$ among the number of the receiving antennas and the number of the transmitting antennas is greater than or equal to 2 and is less than or equal to 7, distribution of each rank in the rank receiving window meets the following conditions: the ranks in the rank receiving window in turn are an alternate sequence of x and y, the value of y and the value of x differ by 1; or when $N_{maxS}$ is equal to 8, distribution of each rank in the rank receiving window meets the following conditions: the ranks in the rank receiving window comprise x and y and there are no continuous x and y, the value of y and the value of x differ by 1 or 2, or the ranks in the rank receiving window comprise x, y, and z, and one of x, y, and z is adjacent to the other two.

The present invention can reasonably forecast change of ranks of MIMO channels so as to better use MIMO channel resources to perform data transmission and improve the throughput rate of the MIMO channels.

PREFERRED EMBODIMENTS OF THE PRESENT INVENTION

Figure 1:
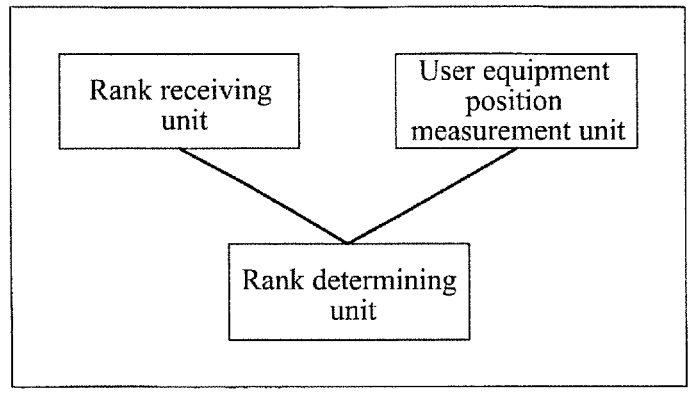
FIG. 1 is a block diagram of an apparatus for rank self-adaptation in accordance with the present invention.

As shown in FIG. 1, an apparatus for rank self-adaptation in accordance with the present invention comprises a rank determining unit, a rank receiving unit and a user equipment position measurement unit respectively connected to the rank determining unit.

The rank receiving unit is configured to receive ranks reported by a user equipment via a rank receiving window to send to the rank determining unit.

The user equipment position measurement unit is configured to measure whether the user equipment is located at the edge of a cell to which the user equipment belongs; the user equipment being located at the edge of the cell to which the user equipment belongs means that reference signal received power of the cell reported by the user equipment is less than or equal to a reference signal received power threshold of the cell configured by a system; and the user equipment being not located at the edge of the cell to which the user equipment belongs means that the reference signal received power of the cell reported by the user equipment is greater than the reference signal received power threshold of the cell configured by the system.

The rank determining unit is configured to determine a rank at the current moment based on a distribution state of each rank in the rank receiving window at the current moment, and determine the number of independent channels used for sending downstream data to the user equipment based on the rank at the current moment; and when determining the distribution state of each rank received in the rank receiving window is state 3 or state 4, obtain information whether the user equipment is located at the edge of the cell to which the user equipment belongs from the user equipment position measurement unit, and determine the rank at the current moment based on the position of the user equipment.

When the rank receiving unit determines the distribution state of each rank received in the rank receiving window, the used determining method is the same as that described in the following rank self-adaptation method.

Figure 2:
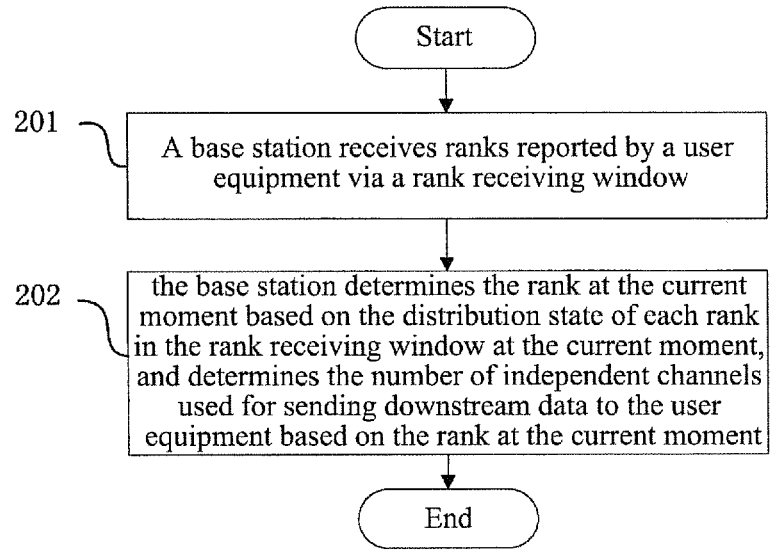
FIG. 2 is a flow chart of a method for rank self-adaptation in accordance with the present invention.

As shown in FIG. 2, the method for rank self-adaptation comprises the following steps:

At step 201, a base station receives ranks reported by a user equipment via a rank receiving window.

The length (Trank) of the rank receiving window can be defined as a fixed length, or can be defined as a multiple of a reporting period of a fixedly received rank. Generally, the value of the Trank is from 50 ms to 1000 ms, or is N times of the reporting period of the rank, and the value range of N is an integer from 3 to 12. For example, the length of the rank receiving window is defined as 200 ms or 3 reporting periods of the rank.

Complementally, the length of the rank receiving window can be determined based on the smallest value $N_{maxS}$ among the number of receiving antennas and the number of the transmitting antennas. The greater the value of the $N_{maxS}$ is, the greater the value of the length of the rank receiving window is.

Figure 3:
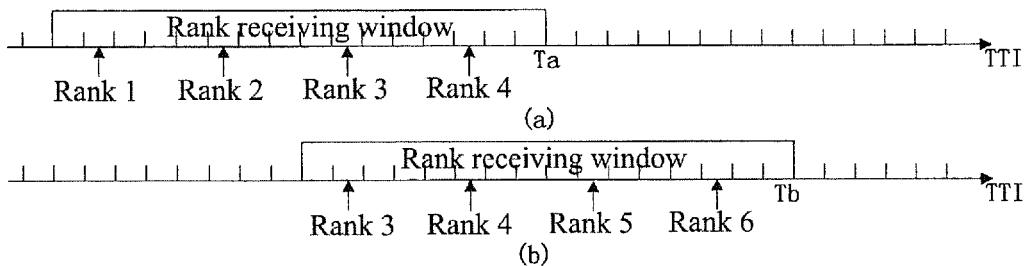
FIG. 3 is a processing procedure of a rank receiving window in a method and apparatus for rank self-adaptation in accordance with the present invention.

The processing procedure of the rank receiving window is shown in FIG. 3, in which the reporting period of the rank is set to be 4 transmission time intervals (TTI for short), N is set to be 4, namely, the length of the rank receiving window is 12 TTIs, and the rank receiving window slides by taking time as its axle. (a) in FIG. 3 shows that when the current moment is Ta, ranks received in the rank receiving window comprise rank1, rank2, rank3 and rank4. (b) in FIG. 3 shows that when the current moment is Tb, ranks received in the rank receiving window comprise rank3, rank4, rank5 and rank6.

For MIMO channels formed by $N_T$ transmitting and $N_R$ receiving antennas, the value of the rank reported by the user equipment is one of $\{1, \ldots, N_{maxS}\}$, where $N_{maxS} = \min\{N_T, N_R\}$.

At step 202, the base station determines the rank at the current moment based on the distribution state of each rank in the rank receiving window at the current moment, and determines the number of independent channels used for sending downstream data to the user equipment based on the rank at the current moment.

(1) When the number of the ranks in the rank receiving window is greater than the threshold A (A is an integer greater than or equal to 3), determining the rank at the current moment based on the distribution state of each rank received in the rank receiving window specifically comprises the following several situations:

State 1 (or referred to as a stable state) means that the value of each rank in the rank receiving window is the same; under state 1, the newly reported rank in the rank receiving window is taken as the rank at the current moment.

State 2 (or referred to as a slow change state) means that when $N_{maxS}$ is greater than or equal to 2 and is less than or equal to 7, distribution of each rank in the rank receiving window meets the following conditions: the ranks in the rank receiving window in turn are continuous x and continuous y, namely, $\{x, \ldots, x, y \ldots, y\}$, values of x and y differ by 1, where $x, y \in \{1, \ldots, N_{maxS}\}$, and the number of y is greater than or equal to the number of x; when $N_{maxS}$ is equal to 8, distribution of each rank in the rank receiving window meets the following conditions: the ranks in the rank receiving window in turn are continuous multiple x and continuous multiple y and continuous multiple z, namely, $\{x, y, \ldots, y, z, \ldots, z\}$, where $x, y, z \in \{1, \ldots, N_{maxS}\}$, difference values between x, y, z in turn are 1, values of x, y, z in turn increase or decrease, and the total number of y and z is greater than or equal to the number of x, the number of z is greater than or equal to the number of y. Under state 2, the newly reported rank in the rank receiving window is taken as the rank at the current moment.

State 3 (or referred to as a sudden change state) means that distribution of each rank in the rank receiving window meets the following conditions: the ranks in the rank receiving window in turn are continuous multiple x and one y, the absolute difference value between y and x is m, $x, y \in \{1, \ldots, N_{maxS}\}$, $1 \leq m \leq N_{maxS} - 1$. Under state 3, when the difference value between y and x is less than 0 (indicating that the sudden change direction of the rank is decrease), the newly reported rank in the rank receiving window is taken as the rank at the current moment; when the difference value between y and x is greater than 0 (indicating that the change direction of the rank is increase) and the user equipment is located at the edge of a cell to which the user equipment belongs, 1 is taken as the rank at the current moment; when the difference value between y and x is greater than 0 and the user equipment is not located at the edge of the cell to which the user equipment belongs, x+1 is taken as the rank at the current moment.

State 4 (or referred to as a shear state) means that distribution of each rank in the rank receiving window meets the following conditions: the ranks in the rank receiving window in turn are continuous multiple x and continuous multiple y, namely, $\{x, \ldots x, y \ldots, y\}$, $x, y \in \{1, \ldots, N_{maxS}\}$, x is not equal to y, the number of y is less than the number of x, and the number of y is greater than or equal to n, n is greater than or equal to 2. Under state 4, when the value of y is less than x (indicating that the shear direction of the rank is decrease), the newly reported rank in the rank receiving window is taken as the rank at the current moment; when the value of y is greater than or equal to x (indicating that the shear direction of the rank is increase) and the user equipment is located at the edge of the cell to which the user equipment belongs, 1 is taken as the rank at the current moment; when the value of y is greater than x and the user equipment is not located at the edge of the cell to which the user equipment belongs, the newly reported rank in the rank receiving window is taken as the rank at the current moment.

Whether the user equipment is located at the edge of the cell to which the user equipment belongs in state 3 and state 4 may be determined based on reference signal received power (RSRP for short) of the cell reported by the user equipment. For example, when the RSRP of the cell reported by the user equipment is less than or equal to a RSRP threshold a, the user equipment is determined to be located at the edge of the cell; when the reference signal received power of the cell reported by the user equipment is greater than the RSRP threshold a, the user equipment is determined to be not located at the edge of the cell.

State 5 (or referred to as an oscillation state) means that distribution of each rank in the rank receiving window meets the following conditions when $N_{maxS}$ is greater than or equal to 2 and is less than or equal to 7: the ranks in the rank receiving window in turn are an alternate sequence of x and y, x, y∈{1, ..., $N_{maxS}$}, the value of y and the value of x differ by 1; when $N_{maxS}$ is equal to 8, distribution of each rank in the rank receiving window meets the following conditions: the ranks in the rank receiving window comprise x and y and there are no continuous x and y, x, y∈{1, ..., $N_{maxS}$}, the value of y and the value of x differ by 1 or 2, or the ranks in the rank receiving window comprise x, y and z and one of x, y and z is adjacent to the other two, x, y, z∈{1, ..., $N_{maxS}$}. Under state 5, the smallest rank in the rank receiving window is taken as the rank at the current moment.

State 6 (or referred to as a hopping change state): when the distribution state of each rank received in the rank receiving window is not any one of state 1 to state 5 described above, then it is believed that the distribution state of each rank received in the rank receiving window is the hopping change state. Under state 6, the smallest rank in the rank receiving window is taken as the rank at the current moment.

Under the general situation, when the distribution state of each rank in the rank receiving window is determined, whether it is state 1 is first determined, if not, whether it is state 2 is determined, and so on; or the five states may be determined regardless of the order of determinations.

When $N_{maxS}$ is greater than or equal to 2 and is less than or equal to 3, when it is determined that the distribution state of each rank in the rank receiving window does not meet state 1, state 2, state 3 and state 4, whether it is state 5 or state 6 will not be determined, and 1 is taken as the rank at the current moment directly.

(2) When the number of the ranks in the rank receiving window is less than the threshold A (A is an integer greater than or equal to 3), the smallest rank in the rank receiving window is taken as the rank at the current moment.

The First Specific Embodiment

For a MIMO channel formed by two transmitting antennas $N_T$ and two receiving antennas $N_R$, $N_{maxS}$ is 2, namely, the value of a rank fed back by a UE is 1 or 2. The reporting period of the rank is 10 TTIs, the length of a rank receiving window is 4 times of the reporting period of the rank, namely, N=4. The threshold m used for determining whether the rank is sudden change is 1, and the threshold n used for determining whether the rank is shear is 2. Whether the UE is located at the edge of a cell to which the UE belongs is determined based on the RSRP of the cell reported by the UE, and the threshold A is 10.

At a certain moment, the ranks in the rank receiving window are {1, 1, 1, 1}, if the ranks are determined to meet a stability condition, scheduling is performed for the UE by using a rank of 2 newly reported.

At a certain moment, the ranks in the rank receiving window are {1, 1, 2, 2}, it is determined first that the ranks do not meet the stability condition, it is further determined the ranks meet the slow change condition, therefore, scheduling is performed by using a rank of 2 newly reported by the UE.

At a certain moment, the ranks in the rank receiving window are {1, 1, 1, 2}, it is determined first that the ranks do not meet the stability condition or slow change condition, when it is further determined the ranks meet the sudden change condition and that the user equipment is located at the edge of the cell to which the user equipment belongs, 1 is taken as the rank at the current moment.

At a certain moment, the ranks in the rank receiving window are {1, 1, 2, 1}, it is determined first that the ranks do not meet the stability condition or slow change condition, if it is further determined the ranks do not meet the sudden change condition and that the ranks are not shear, then scheduling is performed by using the smallest rank of 1 in the rank receiving window.

At a certain moment, the ranks in the rank receiving window are {1, 2, 2, 1}, it is determined first that the ranks do not meet the stability condition or slow change condition, if it is further determined the ranks do not meet the sudden change condition and that the ranks are not shear, then scheduling is performed by using the smallest rank of 1 in the rank receiving window.

At a certain moment, the ranks in the rank receiving window are {1, 2, 1, 1}, it is determined first that the ranks do not meet the stability condition or slow change condition, if it is further determined the ranks do not meet the sudden change condition and that the ranks are not shear, then scheduling is performed by using the smallest rank of 1 in the rank receiving window.

The Second Specific Embodiment

For a MIMO channel formed by four transmitting antennas $N_T$ and four receiving antennas $N_R$, $N_{maxS}$ is 4, namely, the value of a rank fed back by a UE is 1, 2, 3 or 4. The reporting period of the rank is 4 TTIs, the length of a rank receiving window is 4 times of the reporting period of the rank, namely, N=4. The threshold m used for determining whether the rank is sudden change is 2, and the threshold n used for determining whether the rank is shear is 2. Whether the UE is located at the edge of a cell to which the UE belongs is determined based on the RSRP of the cell reported by the UE, and the threshold a is 10.

At a certain moment, the ranks in the rank receiving window are {2, 2, 2, 2}, if the ranks are determined to meet a stability condition, scheduling is performed for the UE by using a rank of 2 newly reported.

At a certain moment, the ranks in the rank receiving window are {2, 2, 3, 3}, it is determined first that the ranks do not meet the stability condition, it is further determined that the ranks meet the slow change condition. Therefore, scheduling is performed by using a rank of 3 newly reported.

At a certain moment, the ranks in the rank receiving window are {3, 3, 3, 1}, it is determined first that the ranks do not meet the stability condition or slow change condition, it is further determined that the ranks meet the slow change condition, that the ranks meet the sudden change condition and that the sudden change direction of the rank reported by the UE is decrease. Therefore, scheduling is performed by using a rank of 1 newly reported by the UE.

At a certain moment, the ranks in the rank receiving window are {2, 2, 2, 4}, it is determined first that the ranks do not meet the stability condition or slow change condition, it is further determined that the ranks do not meet the slow change condition, that the ranks meet the sudden change condition and that the sudden change direction of the rank reported by the UE is increase; the RSRP of the cell to which the UE belongs reported by the UE is 5, and it is further determined that the UE is at the edge of the cell. Therefore, scheduling is performed by using a rank of 1.

The present invention can reasonably forecast change of ranks of MIMO channels so as to better use MIMO channel resources to perform data transmission and improve the throughput rate of the MIMO channels.

Although the present invention is described in conjunction with specific embodiments, various modifications and variations may be made by those skilled in the art without departing from the spirit or scope of the present invention. Such modifications or variations should be viewed as within the scope of the present invention and the scope of the appended claims.

INDUSTRIAL APPLICABILITY

The method and apparatus for rank self-adaptation in accordance with the present invention allow the base station to determine the rank at the current moment based on the distribution state of each rank in the rank receiving window at the current moment, and reasonably forecast change of ranks of MIMO channels so as to better use MIMO channel resources to perform data transmission.

What we claim is:

1. A method for rank self-adaptation based on pre-defined distribution states of ranks, the method comprising:
a base station receiving ranks reported by a user equipment via a rank receiving window, determining a rank at the current moment based on one of the pre-defined distribution states of ranks to which a distribution state of each rank in the rank receiving window at the current moment belongs, and determining the number of independent channels used for sending downstream data to the user equipment based on the rank at the current moment;
wherein in the step of determining the rank at the current moment:
when the number of ranks in the rank receiving window is greater than a threshold A and the distribution state of each rank in the rank receiving window at the current moment is state 2, the base station takes a rank newly reported by the user equipment in the rank receiving window as the rank at the current moment;
wherein state 2 means that:
when the smallest value $N_{maxS}$ among the number of receiving antennas and the number of transmitting antennas is greater than or equal to 2 and is less than or equal to 7, distribution of each rank in the rank receiving window meets the following conditions: the ranks in the rank receiving window in turn are continuous x and continuous y, where values of x and y differ by 1, and the number of y is greater than or equal to the number of x; or
when $N_{maxS}$ is equal to 8, distribution of each rank in the rank receiving window meets the following conditions: the ranks in the rank receiving window in turn are continuous x, continuous y and continuous z, where difference values of x, y, z in turn are 1, values of x, y, z in turn increase or decrease, and the total number of y and z is greater than or equal to the number of x, and the number of z is greater than or equal to the number of y.

2. The method according to claim 1, wherein in the step of determining the rank at the current moment:
when the number of the ranks in the rank receiving window is greater than the threshold A and the distribution state of each rank in the rank receiving window at the current moment is state 3, state 3 means that the ranks in the rank receiving window in turn are continuous x and one y, the absolute difference value between y and x is m, m is greater than or equal to 1 and is less than or equal to $N_{maxS}-1$, $N_{maxS}$ is the smallest value among the number of the receiving antennas and the number of the transmitting antennas; and the base station is further configured to:
when the difference value between y and x is less than 0, take the newly reported rank in the rank receiving window as the rank at the current moment;
when the difference value between y and x is greater than 0 and the user equipment is located at an edge of a cell to which the user equipment belongs, take 1 as the rank at the current moment; and
when the difference value between y and x is greater than 0 and the user equipment is not located at the edge of the cell to which the user equipment belongs, take x+1 as the rank at the current moment.

3. The method according to claim 2, wherein in the step of determining the rank at the current moment:
when the number of the ranks in the rank receiving window is greater than the threshold A and the distribution state of each rank in the rank receiving window at the current moment is state 4, state 4 means that the ranks in the rank receiving window in turn are continuous x and y, x is not equal to y, the number of y is less than the number of x, and the number of y is greater than or equal to n, and n is greater than or equal to 2; and the base station is further configured to:
when the value of y is less than x, take the newly reported rank in the rank receiving window as the rank at the current moment;
when the value of y is greater than or equal to x and the user equipment is located at the edge of the cell to which the user equipment belongs, take 1 as the rank at the current moment; and
when the value of y is greater than or equal to x and the user equipment is not located at the edge of the cell to which the user equipment belongs, take the newly reported rank in the rank receiving window as the rank at the current moment.

4. The method according to claim 2, wherein
the user equipment being located at the edge of the cell to which the user equipment belongs means that reference signal received power of the cell reported by the user equipment is less than or equal to a reference signal received power threshold of the cell configured by a system; and
the user equipment being not located at the edge of the cell to which the user equipment belongs means that the reference signal received power of the cell reported by the user equipment is greater than the reference signal received power threshold of the cell configured by the system.

5. The method according to claim 1, wherein in the step of determining the rank at the current moment:
when the number of the ranks in the rank receiving window is greater than the threshold A and the distribution state of each rank in the rank receiving window at the current moment is state 5, the base station takes the smallest rank in the rank receiving window as the rank at the current moment;
state 5 means that when the smallest value $N_{maxS}$ among the number of the receiving antennas and the number of the transmitting antennas is greater than or equal to 2 and is less than or equal to 7, distribution of each rank in the rank receiving window meets the following conditions: the ranks in the rank receiving window in turn are an alternate sequence of x and y, the value of y and the value of x differ by 1; or
when $N_{maxS}$ is equal to 8, distribution of each rank in the rank receiving window meets the following conditions: the ranks in the rank receiving window comprise x and y and there are no continuous x and y, the value of y and the value of x differ by 1 or 2, or the ranks in the rank receiving window comprise x, y and z, and one of x, y and z is adjacent to the other two.

6. The method according to claim 1, wherein in the step of determining the rank at the current moment:
when the number of the ranks in the rank receiving window is greater than the threshold A, and the smallest value $N_{maxS}$ among the number of the receiving antennas and the number of the transmitting antennas is greater than or equal to 2 and is less than or equal to 3, and when the distribution state of each rank in the rank receiving window at the current moment does not meet state 1, state 2, state 3 and state 4, takes 1 as the rank at the current moment;
state 1 means that the value of each rank in the rank receiving window is the same;
state 2 means that distribution of each rank in the rank receiving window meets the following conditions: the ranks in the rank receiving window in turn are continuous x and continuous y, where the value of x and the value of y differ by 1, the number of y is greater than or equal to the number of x;
state 3 means that the ranks in the rank receiving window in turn are continuous x and one y, the absolute difference value between y and x is in, m is greater than or equal to 1 and is less than or equal to $N_{maxS}-1$; and
state 4 means that the ranks in the rank receiving window in turn are continuous x and y, x is not equal to y, the number y is less than the number of x, and the number of y is greater than or equal to n, and n is greater than or equal to 2.

7. The method according to claim 1, wherein in the step of determining the rank at the current moment:
when the number of the ranks in the rank receiving window is greater than the threshold A, and the smallest value $N_{maxS}$ among the number of the receiving antennas and the number of the transmitting antennas is greater than or equal to 4, and when the distribution state of each rank in the rank receiving window at the current moment does not meet state 1, state 2, state 3, state 4 and state 5, the base station takes the smallest rank in the rank receiving window as the rank at the current moment;
state 1 means that the value of each rank in the rank receiving window is the same;
state 2 means that when $N_{maxS}$ is greater than or equal to 4 and is less than or equal to 7, distribution of each rank in the rank receiving window meets the following conditions: the ranks in the rank receiving window in turn are continuous x and continuous y, the value of x and the value of y differ by 1, and the number of y is greater than or equal to the number of x; or when $N_{maxS}$ is equal to 8, distribution of each rank in the rank receiving window meets the following conditions: the ranks in the rank receiving window in turn are continuous x, continuous y and continuous z, where difference values between x, y, z in turn are 1, values of x, y, z in turn increase or decrease, and the total number of y and z is greater than or equal to the number of x, the number of z is greater than or equal to the number of y;
state 3 means that the ranks in the rank receiving window in turn are continuous x and one y, the absolute difference value between y and x is m, m is greater than or equal to 1 and is less than or equal to $N_{maxS}-1$;
state 4 means that the ranks in the rank receiving window in turn are continuous x and y, x is not equal to y, the number of y is less than the number of x, and the number of y is greater than or equal to n, and n is greater than or equal to 2; and
state 5 means that when $N_{maxS}$ is greater than or equal to 4 and is less than or equal to 7, distribution of each rank in the rank receiving window meets the following conditions: the ranks in the rank receiving window in turn are an alternate sequence of x and y, the value of y and the value of x differ by 1; or when $N_{maxS}$ is equal to 8, distribution of each rank in the rank receiving window meets the following conditions: the ranks in the rank receiving window comprise x and y and there is no continuous x and y, the value of y and the value of x differ by 1 or 2, or the ranks in the rank receiving window comprise x, y and z and one of the x, y and z is adjacent to the other two.

8. The method according to claim 1, wherein in the step of determining the rank at the current moment:
when the number of the ranks in the rank receiving window is less than the threshold A, the base station takes the smallest rank in the rank receiving window as the rank at the current moment.

9. The method according to claim 1, wherein the threshold A is an integer greater than or equal to 3.

10. An apparatus for rank self-adaptation based on pre-defined distribution states of ranks, the apparatus comprising:
a connected rank receiving unit and a rank determining unit;
the rank receiving unit is configured to receive ranks reported by a user equipment via a rank receiving window to send to the rank determining unit; and
the rank determining unit is configured to determine a rank at the current moment based on one of the pre-defined distribution states of ranks to which a distribution state of each rank in the rank receiving window at the current moment belongs, and determine the number of independent channels used for sending downstream data to the user equipment based on the rank at the current moment;
wherein
the rank determining unit is further configured to, when determining that the number of ranks in the rank receiving window is greater than a threshold A and the distribution state of each rank in the rank receiving window at the current moment is state 2, take a rank newly reported by the user equipment in the rank receiving window as the rank at the current moment;
wherein state 2 means that:
when the smallest value $N_{maxS}$ among the number of receiving antennas and the number of transmitting antennas is greater than or equal to 2 and is less than or equal to 7, distribution of each rank in the rank receiving window meets the following conditions: the ranks in the rank receiving window in turn are continuous x and continuous y, where values of x and y differ by 1, and the number of y is greater than or equal to the number of x; or
when $N_{maxS}$ is equal to 8, distribution of each rank in the rank receiving window meets the following conditions: the ranks in the rank receiving window in turn are continuous x, continuous y and continuous z, where difference values of x, y, z in turn are 1, values of x, y, z in turn increase or decrease, and the total number of y and z is greater than or equal to the number of x, and the number of z is greater than or equal to the number of y.

11. The apparatus according to claim 10, further comprising a user equipment position measurement unit connected to the rank determining unit, wherein
the user equipment position measurement unit is configured to measure whether the user equipment is located at an edge of a cell to which the user equipment belongs;
the rank determining unit is further configured to: when determining that the number of the ranks in the rank receiving window is greater than the threshold A and the distribution state of each rank in the rank receiving window at the current moment is state 3, state 3 meaning that the ranks in the rank receiving window in turn are continuous x and one y, the absolute difference value between y and x is m, m is greater than or equal to 1 and is less than or equal to $N_{maxS}-1$, and $N_{maxS}$ is the smallest value among the number of the receiving antennas and the number of the transmitting antennas, when determining that the difference value between y and x is less than 0, take the newly reported rank in the rank receiving window as the rank at the current moment; and when determining that the difference value between y and x is greater than 0, obtain information whether the user equipment is located at the edge of the cell to which the user equipment belongs from the user equipment position measurement unit, and determine the rank at the current moment based on the position of the user equipment: when the user equipment is located at the edge of the cell to which the user equipment belongs, take 1 as the rank at the current moment; and when the user equipment is not located at the edge of the cell to which the user equipment belongs, take x+1 as the rank at the current moment.

12. The apparatus according to claim 11, further comprising the user equipment position measurement unit connected to the rank determining unit, wherein the user equipment position measurement unit is configured to measure whether the user equipment is located at the edge of the cell to which the user equipment belongs;

the rank determining unit is further configured to: when determining that the number of the ranks in the rank receiving window is greater than the threshold A and the distribution state of each rank in the rank receiving window at the current moment is state 4, state 4 meaning that the ranks in the rank receiving window in turn are continuous x and y, x is not equal to y, the number of y is less than the number of x, and the number of y is greater than or equal to n, and n is greater than or equal to 2, when determining that the value of y is less than x, take the newly reported rank in the rank receiving window as the rank at the current moment; and when determining that the value of y is greater than or equal to x, obtain information whether the user equipment is located at the edge of the cell to which the user equipment belongs from the user equipment position measurement unit, and determine the rank at the current moment based on the position of the user equipment: when the user equipment is located at the edge of the cell to which the user equipment belongs, take 1 as the rank at the current moment; and when the user equipment is not located at the edge of the cell to which the user equipment belongs, take the newly reported rank in the rank receiving window as the rank at the current moment.

13. The apparatus according to claim 10, wherein the rank determining unit is further configured to, when determining that the number of the ranks in the rank receiving window is greater than the threshold A and the distribution state of each rank in the rank receiving window at the current moment is state 5, take the smallest rank in the rank receiving window as the rank at the current moment;

state 5 means that when the smallest value $N_{maxS}$ among the number of the receiving antennas and the number of the transmitting antennas is greater than or equal to 2 and is less than or equal to 7, distribution of each rank in the rank receiving window meets the following conditions: the ranks in the rank receiving window in turn are an alternate sequence of x and y, the value of y and the value of x differ by 1; or when $N_{maxS}$ is equal to 8, distribution of each rank in the rank receiving window meets the following conditions: the ranks in the rank receiving window comprise x and y and there are no continuous x and y, the value of y and the value of x differ by 1 or 2, or the ranks in the rank receiving window comprise x, y, and z, and one of x, y, and z is adjacent to the other two.

14. The method according to claim 3, wherein the user equipment being located at the edge of the cell to which the user equipment belongs means that reference signal received power of the cell reported by the user equipment is less than or equal to a reference signal received power threshold of the cell configured by a system; and the user equipment being not located at the edge of the cell to which the user equipment belongs means that the reference signal received power of the cell reported by the user equipment is greater than the reference signal received power threshold of the cell configured by the system.

15. The method according to claim 2, wherein the threshold A is an integer greater than or equal to 3.

16. The method according to claim 3, wherein the threshold A is an integer greater than or equal to 3.

17. The method according to claim 5, wherein the threshold A is an integer greater than or equal to 3.

18. The method according to claim 6, wherein the threshold A is an integer greater than or equal to 3.

* * * * *

UNITED STATES PATENT AND TRADEMARK OFFICE
CERTIFICATE OF CORRECTION

PATENT NO. : 8,755,810 B2
APPLICATION NO. : 13/258557
DATED : June 17, 2014
INVENTOR(S) : Yuanchun Tan et al.

Page 1 of 1

It is certified that error appears in the above-identified patent and that said Letters Patent is hereby corrected as shown below:

In the Claims:

Claim 6, Column 13, Line 22, after "value between y and x is" delete "in" and insert --m--.

Signed and Sealed this
Nineteenth Day of August, 2014

Michelle K. Lee
*Deputy Director of the United States Patent and Trademark Office*